2,956,085

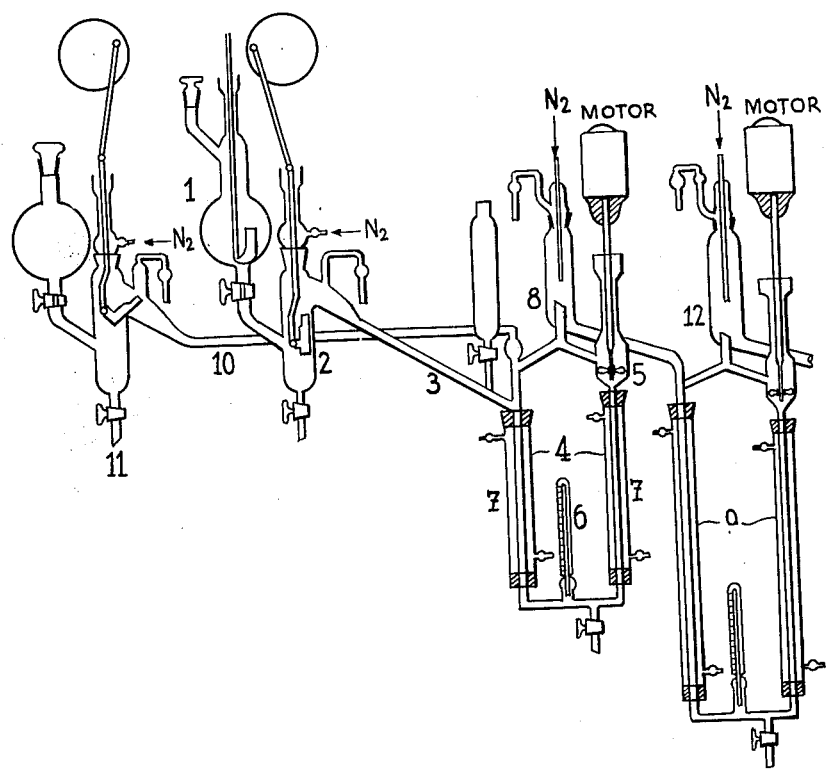
Oct. 11, 1960    H. RUSCHIG ET AL    2,956,085
PROCESS AND APPARATUS FOR PRODUCING ARYLSODIUM
Filed June 24, 1958
HEINRICH RUSCHIG
ROBERT FUGMANN
WILHELM MEIXNER
INVENTORS ' # United States Patent Office 2,956,085
Patented Oct. 11, 1960

PROCESS AND APPARATUS FOR PRODUCING ARYLSODIUM

Heinrich Ruschig, Bad Soden (Taunus), Robert Fugmann, Frankfurt am Main, and Wilhelm Meixner, Hofheim (Taunus), Germany, assignors to Farbwerke Hoechst Aktiengesellschaft vormals Meister Lucius & Bruning, Frankfurt am Main, Germany, a corporation of Germany Filed June 24, 1958, Ser. No. 744,247

Claims priority, application Germany June 27, 1957

7 Claims. (Cl. 260—665)

It is known that suspensions containing phenylsodium and suitable to be used for further reactions can be produced by causing chlorobenzene to act on metallic sodium in an indifferent medium (French Patent 736,428; British Patent 412,049; Angewandte Chemie 49, 456 (1936)). The reaction is carried out by means of sodium metal cut into small pieces and covered with benzene. Chlorobenzene is added dropwise while stirring and owing to the sensitiveness of the phenylsodium its isolation is dispensed with. The suspensions thus obtained are forthwith subjected to further reactions.

In view of the following reasons the production of phenylsodium requires, however, great care and attention:

(1) The reaction must be carried out in a temperature range from +30° C. to +40° C. When applying lower temperatures, the reaction cannot be started at all or only with much delay. In the latter case it is performed too slowly. Temperatures above 40° C. have to be avoided by the following reasons: When applying an elevated temperature, the Wurtz synthesis with formation of diphenyl takes place as side reaction between phenylsodium which has already been formed and chlorobenzene which has not yet been reacted. Thereby, the yield of phenylsodium is reduced. On the other hand, the reaction may become very violent, often explosive, when high temperatures are applied. Since the reaction itself is strongly exothermic, it is difficult to maintain the temperature range required.

(2) A further condition for the start of the reaction consists in the fact that chlorobenzene must act upon sodium in a certain minimum concentration. On the other hand, however, this initial concentration is not allowed to exceed an even slightly elevated value since, otherwise, too much material ready for reaction would be present when the reaction suddenly starts. This would cause temperature rises no more controllable.

(3) Suspensions containing phenylsodium tend to produce spontaneous inflammation when coming into contact with atmospheric oxygen. In a no more controllable reaction caused by spontaneous rise of the temperatures part of the phenylsodium suspension which is spontaneously inflammable and highly liable to take fire can be flung out of the reaction vessel which is under a nitrogen atmosphere and which then takes fire. In view of these circumstances it is comprehensible that the phenylsodium method is applied only sporadically in preparative chemistry and not at all in technical processes.

The preparation of, for example, phenylsodium already requires much attention when a sodium amount of 0.5 mol is concerned. The discontinuous method of operation hitherto known does no more allow of a safe control of the heat amounts which are often suddenly present when batches of more than 4 mols of sodium are made.

When continuously introducing sodium metal, invincible difficulties hitherto inhibited the continuous course of the reaction in a thermically better controllable reaction tube. None of the known dosing devices in which valves or taps are moved is capable of carrying out an exact dosage of the sodium metal which may be present, for instance, in finely divided form as suspension in an inert medium, such as benzene or toluene. Because of the special ductility of sodium interruptions of operation always occur which in view of the danger connected with the dismantling of the pumps filled with sodium constitute an unsurmountable handicap.

Now we have found that the above-mentioned hazards and difficulties in the production of suspensions containing arylsodium can be overcome by using for the reaction an apparatus as shown in detail in the annexed drawing. The drawing shows the apparatus on the laboratory scale. The apparatus can, however, likewise be installed according to the same system for producing large amounts of suspensions containing arylsodium.

From a storage tank 1, provided with stirrer, a suspension of sodium metal in an indifferent medium is continuously brought by means of a bucket elevator, such as 2, over a conducting tube 3 to a reaction cycle 4 which is revolved by means of a propeller 5 and controlled by the thermometer 6. The two jackets 7 can be heated or cooled by means of a thermostat and a circulation pump. A second similar cycle of reaction is annexed thereto by means of an overflow 8. Simultaneously with the sodium metal chlorobenzene, for instance, is introduced into the first cycle of reaction 4, over tube 10, by means of a second dosing device as shown, for instance, by 11. The chlorobenzene which is advantageously diluted with an indifferent solvent can be introduced by means of a dosing pump of any desired type. When carrying out the reaction it may, however, prove necessary to control the course of the reaction by regulating the velocity of flow of the sodium metal suspension and of chlorobenzene.

Since some types of pumps as regards the conveying capacity depend in a different manner upon the speed of rotation of the driving apparatus it is of advantage to use a bucket elevator likewise for the dosage of chlorobenzene.

The first of the reaction cycles 4 and 9 is destined to perform the main reaction. The start and the normal course of the reaction can be recognized by the darkening of the reaction medium as well as by the positive evolution of heat. According to the rotating velocity of the cycle, the reaction temperature which can be read at the thermometer 6 is 10–15° higher than the temperature of the heating jacket 7 which is kept constant. When the reaction temperatures amount to approximately 30° C. cooling by means of cold water must be provided for. The second reaction cycle 9 is destined to achieve the reaction, the major part of which has been performed in the first cycle. The product obtained according to the process of the invention leaves cycle 9 by the overflow 12, whereupon it is subjected to further treatment.

Because of the sensitiveness of sodium metal and arylsodium against oxygen of the air, humidity and carbon dioxide the whole apparatus is under an atmosphere of dry nitrogen.

Theoretically, there are needed 2 mols of sodium metal and 1 mol of chlorobenzene for preparing 1 mol of phenylsodium. It is, however, suitable to apply an excessive amount of chlorobenzene in order to ensure the reaction of the total amount of sodium. Unreacted sodium may cause trouble in the further reaction of the phenylsodium suspension.

The yields of arylsodium are between 60 and 90% of the theory, referred to the sodium used. They decisively depend upon the reaction temperature as well as on the time of dwell of the reaction product in the reaction cycle.

The reaction temperature is favorably within the range of +30 and +70° C. With higher temperatures the yield of for instance phenylsodium decreases since then the Wurtz synthesis as competitive reaction increases by taking place between phenylsodium and chlorobenzene which has not yet reacted, with formation of diphenyl. With lower temperatures the reaction is performed considerably more slowly so that the time of dwell of the reactants in the cycle must be increased in order to avoid a reduction of the yield.

The flowing velocities of the reactants are so adjusted that at a temperature of 30-70° C. the average times of dwell of the substances in both reaction cycles amount to about 40-55 minutes.

It can be of advantage to carry out the further reactions of the phenylsodium suspension simultaneously with its preparation in both the reaction cycles 4 and 9. For instance, in a metallizing reaction a suspension containing phenylsodium can serve for replacing weakly acid hydrogen atoms by sodium. In such a case it is of advantage to mix the chlorobenzene with the compound to be metallized, if desired in an indifferent medium. This mixture is introduced into the reaction cycles in the same manner as in other cases the chlorobenzene alone. The phenylsodium intermediately formed immediately transfers its metal to the compound to be metallized, the phenylsodium being converted into benzene. The finally metallized compound leaves the apparatus at the overflow 12.

The apparatus described does not only allow of preparing phenylsodium continuously in a simple manner and without any danger, but above all offers for the first time the possibility of producing phenylsodium in such quantities as are not accessible with the discontinuous method, because of the high consumption of time and labor by this latter process. Finally, the yields obtained according to the continuous method considerably exceed those obtained by the discontinuous process. This is due to the fact that the time of dwell of the products in the zone of the elevated temperature where side reaction can occur, can be reduced to a small fraction of that needed when working according to the discontinuous process. Only in those cases of discontinuous operation in which the phenylsodium is given only a short delay for producing side reactions, i.e. when working with small quantities up to about 0.8 mol yields are reached which irrespective of the reacted quantities are obtained in any case when operating according to the continuous process.

For the performance of the reactions described above there are suitable in addition to chlorobenzene also other substituted aromatic halogen compounds in which the substituents are indifferent or largely indifferent against the very reactive carbon-sodium linkage. Otherwise, as shown in the example of p-bromanisole, the yield is reduced due to side reactions, in this case by splitting of the ether compound.

The following examples serve to illustrate the invention but they are not intended to limit it thereto:

*Example 1*

900 cc. of a solution of 226 grams of chlorobenzene (2 mols) in benzene and 900 cc. of a suspension of 92 grams of sodium metal (4 mols) in benzene are simultaneously introduced within 1 hour into the reaction cycles by means of a bucket elevator. At first, only a few cc. of both solutions are conveyed to the cycle heated to 50° C. and filled with benzene. After a short time the tube contents darkens. The turbine revolving the cycle is started and sodium metal and chlorobenzene are added to the cycle in individual doses. The temperature of the heating jackets is adjusted in such a way that the temperature of the first reaction space amounts to 50-52° C., that of the second cycle to 45° C. The suspension of phenylsodium leaving the apparatus is collected in a storing vessel under nitrogen.

If, with vigorous stirring, dry carbon dioxide is introduced into the benzene phase until saturation is reached, 1 liter of water is then added, the aqueous phase is separated from the benzene phase, and acidified by means of hydrochloric acid, 172 grams of pure benzoic acid, melting at 120-121° C., crystallize out (70.5% of the theory).

*Example 2*

As described in Example 1, 300 cc. of a solution of 63 grams of 4-chlorotoluene (½ mol) in toluene and 300 cc. of a suspension of 23 grams of sodium metal (1 mol) in toluene are reacted in order to obtain 4-toluyl-sodium. In the first cycle of reaction a temperature of 60° C. is maintained, in the second cycle of reaction a temperature of 40° C. The suspension of toluyl-sodium in toluene obtained is reacted while cooling by introducing carbon dioxide in order to obtain the sodium salt of toluic acid.

After saturation of the toluene phase with carbon dioxide, adding with stirring 500 cc. of water, separation of the aqueous phase and acidification with hydrochloric acid 41.5 grams of toluic acid are crystallized out, melting at 176-177° C. (61% of the theory).

*Example 3*

600 cc. of a solution of 113 grams of chlorobenzene (1 mol) in toluene and 600 cc. of a suspension of 46 grams of sodium metal (2 mols) in toluene are simultaneously introduced within 45 minutes into the reaction cycles by means of a bucket elevator. When the reaction has started (see Example 1) the temperature of the first cycle is maintained at 50° C., that of the second cycle at 40° C. A suspension of phenylsodium is obtained.

When slowly adding dropwise to this suspension, while stirring and cooling, a solution of 107 grams of benzaldehyde (1 mol) in 200 cc. of toluene—the reaction temperature not being allowed to exceed 30° C.—after complete introduction allowing the suspension to react for a further 15 minutes at 30° C., while stirring, adding dropwise 1 liter of water and separating the toluene phase, washing again in the separating funnel with 500 cc. of water, drying with sodium sulfate, concentrating by evaporation and distilling the residue, there are obtained 121 grams of benzohydrol boiling at 164-168° C. under a pressure of 12 mm. Hg; melting at 67° C. (66% of the theory).

*Example 4*

As described in Example 1, 300 cc. of a solution containing 94 grams of p-bromanisole (½ mol) in toluene and 300 cc. of a suspension of 23 grams of sodium (1 mol) in toluene are introduced simultaneously into the reaction cycles. During reaction the first cycle is kept at 50° C., the second at 40° C. The reaction product is collected in a storing vessel.

While cooling and stirring a solution of 60 grams (½ mol) of acetophenone in 200 cc. of toluene is added to the reaction product, the temperature not being allowed to exceed 40° C. The product is then allowed, while being stirred, to react for a further 30 minutes at 55° C. It is then cooled, 500 cc. of water are added and the toluene phase is separated off. It is again washed with 500 cc. of water in the separating funnel, dried with sodium sulfate, concentrated by evaporation and distilled. There are obtained 42 grams of a substance boiling at 165-172° C. under a pressure of 0.8 mm. of mercury. By crystallization from a mixture of petroleum ether and isopropyl ether there are obtained 4.3 grams of p-ethoxyphenyl-phenyl-methyl-carbinol.

*Example 5*

(*a*) *Continuous preparation and further reactions.*—As described in Example 1, 1100 cc. of a solution of 283 grams of chlorobenzene (2.5 mols) and 193 grams of cyclohexane-carboxylic acid nitrile (1.77 mols) in toluene and 1100 cc. of a suspension of 115 grams of sodium (5 mols) in toluene are introduced simultaneously into the reaction cycles. After having been heated at the start of the reaction to 50° C. both reaction cycles are kept at a temperature of reaction of 35° C.

The nitrile metallized in α-position flows from the apparatus into a reaction vessel provided with a stirrer and heated to 50° C. in which are contained as alkylating agent 243 grams of 2-bromo-n-butane (1.77 mols), dissolved in 500 cc. of toluene. When the introduction of metallized nitrile is finished, the mixture is allowed still to react for a further 30 minutes at 50° C., while being stirred. 1 liter of water is then added by stirring, and the toluene phase is separated off. It is washed with 1 liter of N-hydrochloric acid, then with 500 cc. of water and subsequently concentrated by evaporation. The residue is distilled through a column. There are obtained 184 grams of alkylated nitrile boiling at 116–119° C. under pressure of 13 mm. Hg absolute (63% of the theory).

(b) *Discontinuous preparation and further reactions.*—
A mixture of 113 grams of chlorobenzene (1 mol) and 75 grams of cyclohexane-carboxylic acid nitrile (0.69 mol) is cautiously added dropwise in several portions at 28–35° C. to a suspension of 46 grams of sodium (2 mols) in 250 cc. of toluene. Before adding each portion, the reaction heat evolved must have calmed down. Care should be taken that each new portion causes a rise of temperature. Otherwise, the reaction has not yet started and it exists the danger that the reaction occurs later on with uncontrollable intensity. The apparatus is filled with dry nitrogen. The introduction of the mixture is finished within 1½ to 2 hours. While stirring is continued for a further 3 hours at 25–30° C. the mixture is allowed further to react.

It is then heated to 50° C. and 95 grams of sec.butyl-bromide (0.69 mol) are added while stirring whereby the temperature evolved by the reaction heat is allowed to raise to 60° C. When the addition of sec.butyl-bromide is finished, the mixture is allowed to react for a further 30 minutes at 50–60° C., it is then cooled and 1 liter of water is cautiously added while stirring. The toluene phase is separated off, washed with 500 cc. of N-hydrochloric acid and subsequently washed with 500 cc. of water before being concentrated by evaporation. The residue is distilled over a column. 61 grams of alkylated nitrile boiling at 120–123° C. under a pressure of 15 mm. Hg absolute is obtained (54% of the theory).

*Example 6*

By means of the bucket elevators 1.2 liters of a solution of 336 grams of chlorobenzene (3 mols) and 297 grams of diethylacetonitrile (3 mols) in benzene are introduced into the reaction cycles simultaneously with 1.2 liters of a suspension of 138 grams of sodium (6 mols) in benzene. The first reaction cycle is kept at 38–41° C., the second at 33–36° C. The suspension of the metallized nitrile in benzene continuously flowing off is collected in a storage tank provided with stirrer.

When dropwise adding to this suspension with stirring and cooling 378 grams of benzyl chloride (3 mols)—the temperature not being allowed to exceed 60° C.—causing the mixture to react again for 30 minutes, cooling and adding 1.2 liters of water, separating the benzene phase which is washed with 1 liter of 2N-hydrochloric acid and with water, there are obtained after concentration by evaporation and distillation 399 grams of diethyl-benzyl-acetonitrile boiling at 157–159° C. under a pressure of 19 mm. Hg absolute (71% of the theory).

We claim:
1. A process for preparing suspensions of arylsodium compounds of the formula

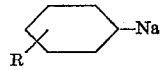

by reaction of metallic sodium with a liquid arylhalide of the formula

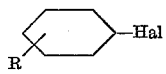

in which formulae Hal is halogen and R is a member of the group consisting of hydrogen, methyl, and methoxy, which process comprises continuously introducing under an inert atmosphere separate portions of said liquid arylhalide and a suspension of metallic sodium in an inert liquid medium into a first reaction vessel having temperature controlling means maintaining the reaction temperature between about 30° C. and 70° C, circulating the liquid mixture thereby formed within said reaction vessel, and continuously withdrawing a portion of said liquid mixture into a second reaction vessel of larger capacity wherein said reaction is completed at a temperature between about 30° C. and 70° C.

2. A process as claimed in claim 1, wherein chlorobenzene is used as arylhalide and benzene is used as inert liquid medium.

3. A process as claimed in claim 1, wherein 4-chlorotoluene is used as arylhalide and toluene is used as inert liquid medium.

4. A process as claimed in claim 1, wherein p-bromanisole is used as arylhalide and toluene is used as inert liquid medium.

5. A process as in claim 1 wherein said inert atmosphere is of nitrogen.

6. An apparatus for continuously reacting a suspension of metallic sodium in an inert liquid medium with a liquid arylhalide of the formula

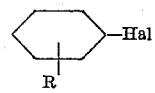

where Hal is halogen and R is a member of the group consisting of hydrogen, methyl, and methoxy to form arylsodium compounds, which apparatus comprises a first storage vessel for said suspension of metallic sodium, a second storage vessel for said arylhalide, bucket elevator within said storage vessels, a first reaction vessel connected by separate conduit with said storage vessels, said bucket elevators being adapted repeatedly to deliver measured portions of said suspension of metallic sodium and of said arylhalide from said storage vessels respectively through said separate conduits to said first reaction vessel, said first reaction vessel having means for regulation of the temperature therein, and a second reaction vessel, connected by an overflow conduit with said first reaction vessel and having temperature regulating means therein, wherein the reaction may proceed further.

7. An apparatus as in claim 6 in which said first and second reaction vessels are provided with stirring means, temperature-measuring means, and cooling means.

References Cited in the file of this patent
UNITED STATES PATENTS

| | | |
|---|---|---|
| 2,012,372 | Bockmuhl et al. | Aug. 27, 1935 |
| 2,531,192 | Bergstrom | Nov. 21, 1950 |
| 2,570,363 | Mereier | Oct. 9, 1951 |